United States Patent [19]

Shimizu et al.

[11] Patent Number: 4,742,260
[45] Date of Patent: May 3, 1988

[54] PIEZOELECTRICALLY DRIVING DEVICE

[75] Inventors: Hiroshi Shimizu, 22-12, Yagiyama Hon-cho 1-chome, Sendai-shi, Miyagi 982; Sumio Sugawara, Yonezawa; Takashi Takada, Shijonawate; Seiki Ishibashi, Osaka, all of Japan

[73] Assignees: Hiroshi Shimizu, Miyagi; Matsushita Electric Works, Ltd., Osaka, both of Japan

[21] Appl. No.: 7,673

[22] Filed: Jan. 28, 1987

[30] Foreign Application Priority Data

Feb. 6, 1986 [JP] Japan .................................. 61-24706
Sep. 25, 1986 [JP] Japan ................................ 61-227502

[51] Int. Cl.⁴ .......................................... H01L 41/08
[52] U.S. Cl. .................................. 310/323; 310/330; 310/331; 310/366; 310/370
[58] Field of Search ............... 310/12, 25, 321, 323, 310/328, 367, 370, 366

[56] References Cited

U.S. PATENT DOCUMENTS

| | | | |
|---|---|---|---|
| 3,131,320 | 4/1964 | Shinada et al. | 310/370 X |
| 3,238,789 | 3/1966 | Erdley | 310/370 X |
| 3,354,413 | 11/1967 | Ko | 310/370 X |
| 4,019,073 | 4/1977 | Vishnevsky et al. | 310/323 X |
| 4,281,298 | 7/1981 | Gounji et al. | 310/370 X |
| 4,325,264 | 4/1982 | Sashida | 310/328 X |
| 4,382,204 | 5/1983 | Yoda | 310/370 X |
| 4,400,641 | 8/1983 | Vishnevsky et al. | 310/323 |
| 4,562,374 | 12/1985 | Sashida | 310/328 X |
| 4,613,782 | 9/1986 | Mori et al. | 310/323 |

FOREIGN PATENT DOCUMENTS

| | | | |
|---|---|---|---|
| 1539922 | 9/1968 | France | 310/370 |
| 0021679 | 2/1980 | Japan | 310/370 |
| 0619986 | 8/1978 | U.S.S.R. | 310/328 |
| 0651434 | 3/1979 | U.S.S.R. | 310/323 |
| 0773715 | 10/1980 | U.S.S.R. | 310/370 |
| 0788229 | 12/1980 | U.S.S.R. | 310/328 |
| 0853711 | 8/1981 | U.S.S.R. | 310/323 |

Primary Examiner—Mark O. Budd
Attorney, Agent, or Firm—Burns, Doane, Swecker & Mathis

[57] ABSTRACT

A piezoelectrically driving device comprises a driving part including paired opposing pole parts substantially square shaped in section, piezoelectric elements provided at least to two adjacent faces of each of the opposing pole parts for causing them to flectionally vibrate resonantly in response to an applied high frequency voltage, and a contact member contactable with one face of each of the opposing pole parts for movement relative thereto or vice versa due to the vibration, any energy loss upon which movement is thereby remarkable restrained and a mechanical driving force can be obtained highly efficiently.

10 Claims, 4 Drawing Sheets

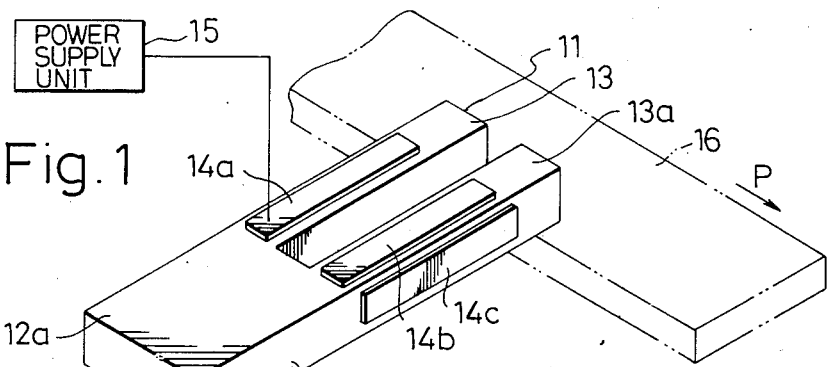
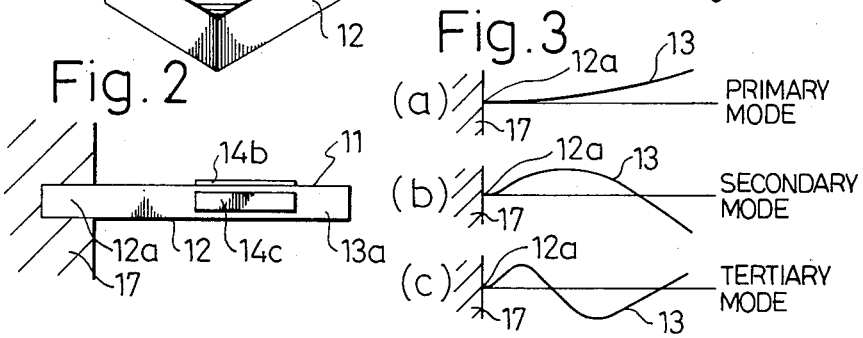
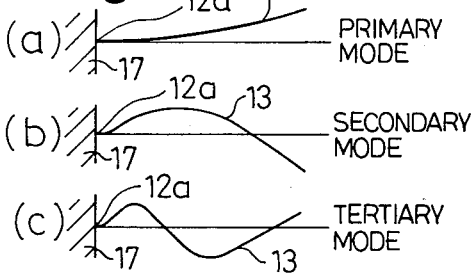
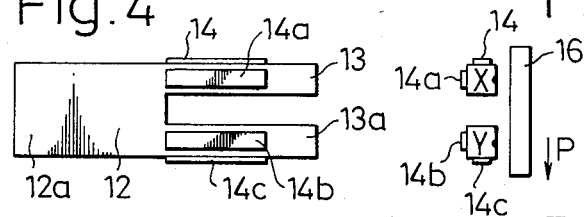
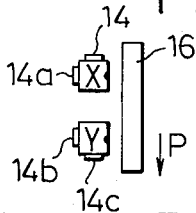
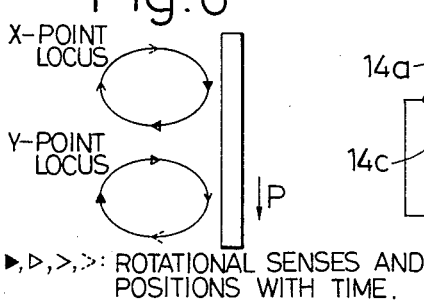
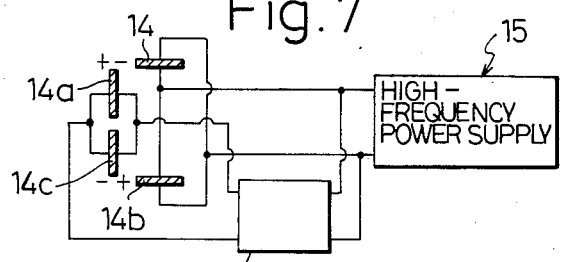

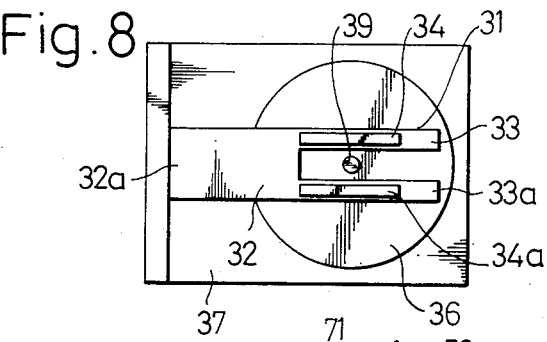
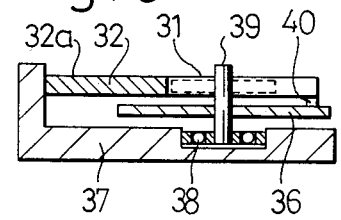
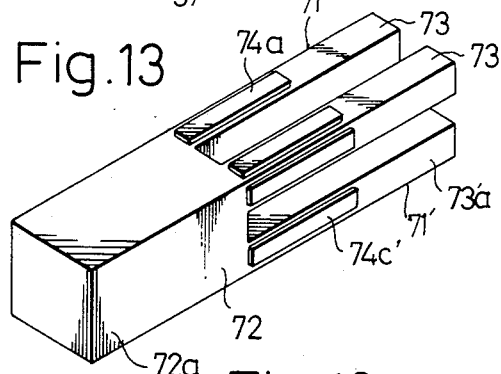
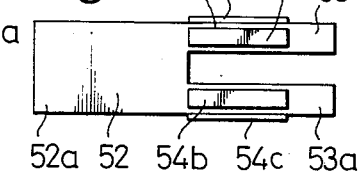
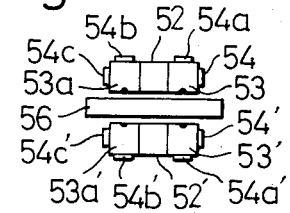
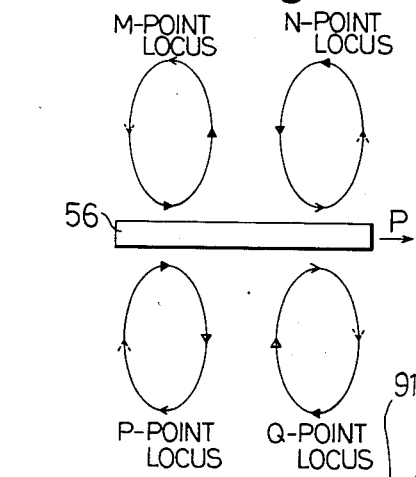
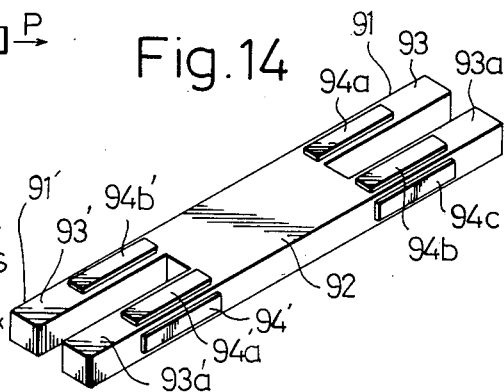

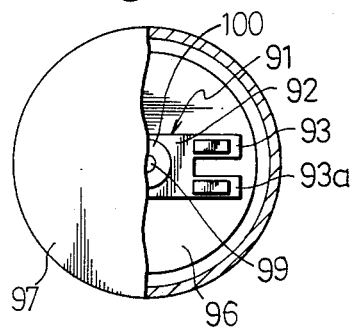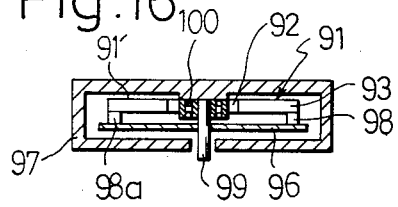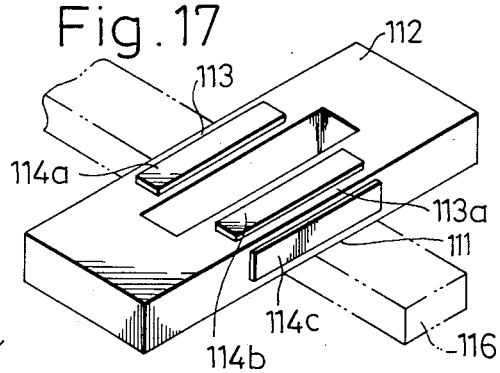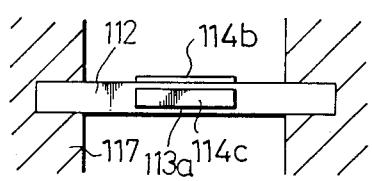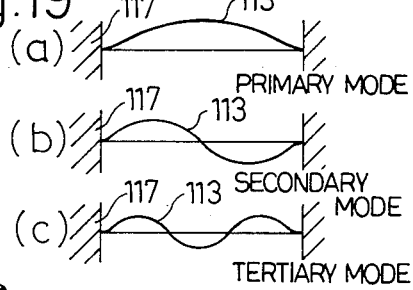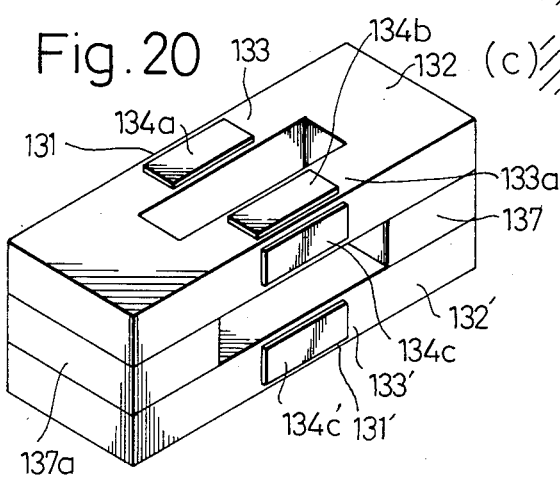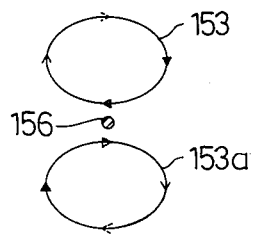

PIEZOELECTRICALLY DRIVING DEVICE

TECHNICAL BACKGROUND OF THE INVENTION

This invention relates to piezoelectrically driving devices and, more particularly, to a piezoelectrically driving device which comprises a vibrator having piezoelectric elements to which a high frequency voltage is applied to generate a reciprocal or rotary movement of the vibrator for providing a mechanical driving force responsive to the movement.

The piezoelectrically driving device of the type referred to can produce the mechanical driving force at a high efficiency and is thus expected to be utilized as a driving power source for relays, an actuator for linear motors or the like.

DISCLOSURE OF PRIOR ART

As a known piezoelectrically driving device, there has been suggested in U.S. Pat. No. 4,325,264 to T. Sashida a supersonic vibration driven motor employing a piezoelectric element. In this known motor, inclined driving pieces are provided to a tip end of a vibrator having a piezoelectric element attached hereto so that a longitudinal movement of the vibrator causes the driving pieces to perform a flexibly deforming movement, and frictional contact of the thus deforming driving pieces with a disc causes the latter to be rotated. However, there have arisen in this motor such problems that the rotational direction of the motor is determined by the direction in which the driving pieces are inclined so as to limit its use, and that the tip ends of the driving pieces are small enough to be remarkably worn off due to concentrative friction with respect to the disc.

There is also suggested by T. Sashida in U.S. Pat. No. 4,562,374 a motor utilizing ultrasonic vibration, in which piezoelectric elements are provided to transmit their vibratory motion entirely to the vibrator, the high frequency voltage is applied to the respective piezoelectric elements as deviated in phase by 90 degrees, to generate a travelling wave on the vibrator, and a rotor brought into frictional contact with the vibrator is thereby rotated. According to this arrangement, the motor can rotate either in normal or reverse direction, but is still defective in that it is necessary to continuously provide an energy for the vibration to the entire vibrator while absorbing vibration of the piezoelectric elements on the other side than the vibrator, so that there arises a large energy loss to hinder intended energy saving. This known motor has such a further problem that, when the motor is to be used as, for example, a driving power source for the linear motor actuator, it is difficult to arrange this motor to have the generated travelling wave circulated, while the circulation is required for the purpose of preventing the energy loss from being further increased otherwise.

TECHNICAL FIELD OF THE INVENTION

A primary object of the present invention is, therefore, to provide a piezoelectrically driving device which can operate either in the normal or reverse direction and can produce a stable mechanical driving force at a high efficiency with a low consumption of energy.

According to the present invention, the above object is attained by providing a piezoelectrically driving device which comprises a vibrator of a flectional material and having piezoelectric element parts, and a power supply unit involving a phase difference for applying a high frequency voltage to the respective piezoelectric element parts for a flectional vibration of the vibrator, which vibration causing a relative movement between the vibrator and a contact member brought into contact with the vibrator, wherein the vibrator includes a driving part having paired opposing pole parts substantially of a square shape in section, and the piezoelectric element parts are provided to at least two adjacent faces of each of the opposing pole parts of the driving part for causing the opposing pole parts to flectionally resonantly vibrate in response to the high frequency voltage applied, and the contact member is provided to be contactable with one face of each of the opposing pole parts of the driving part.

Other objects and advantages of the present invention shall be made clear in the following description of the invention detailed with reference to preferred embodiments shown in accompanying drawings.

BRIEF EXPLANATION OF THE DRAWINGS

FIG. 1 is a perspective view of the piezoelectrically driving device in an embodiment according to the present invention;

FIG. 2 is a side view showing a state in which a vibrator of the device in FIG. 1 is installed on a mounting base;

FIGS. 3(a) to 3(c) are diagrams for explaining vibratory modes of the device of FIG. 1;

FIG. 4 is a top plan view of the vibrator in FIG. 1;

FIG. 5 is a front view of the device of FIG. 1;

FIG. 6 is a diagram for explaining the operation of the device of FIG. 1;

FIG. 7 is a block diagram of a power supply unit for the device of FIG. 1;

FIG. 8 is a top plan view of the device in another embodiment of the present invention;

FIG. 9 is a sectional view of the device of FIG. 8;

FIG. 10 is a top plan view of the vibrator in still another embodiment of the present invention;

FIG. 11 is a front view of the device using the vibrator of FIG. 10;

FIG. 12 is a diagram for explaining the operation of the device of FIG. 11;

FIGS. 13 and 14 are perspective views of vibrators in other different embodiments of the present invention;

FIG. 15 shows in a top plan view, with a part of mounting base shown as cut away, of the device employing the vibrator of FIG. 14;

FIG. 16 is a cross-sectional view of the device of FIG. 15;

FIG. 17 is a perspective view of the device in a further embodiment of the present invention;

FIG. 18 is a side view showing a state in which the vibrator in the device of FIG. 17 is installed in a mounting base;

FIGS. 19(a) to 19(c) are diagrams for explaining the operation of the device of FIG. 17;

FIG. 20 shows in a perspective view the vibrator in yet another embodiment of the present invention;

FIGS. 22 to 24 are diagrams for explaining principles of still other embodiments of the present invention.

Figure 21:
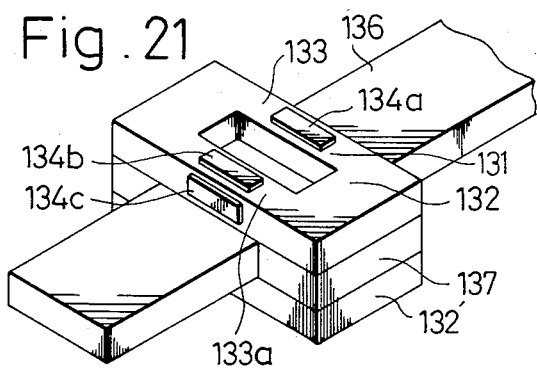
FIG. 21 is a perspective view of the device using the vibrator of FIG. 20.

While the present invention shall now be described with reference to the preferred embodiments shown in the drawings, it should be understood that the intention is not to limit the invention only to the particular embodiments shown but rather to cover all alterations, modifications and equivalent arrangements possible within the scope of appended claims.

DISCLOSURE OF PREFERRED EMBODIMENTS

Referring to FIGS. 1 to 7, there is shown an embodiment of a piezoelectrically driving device according to the present invention as applied to a linear motor, which comprises a vibrator 12 including a vibratory driving part 11. The vibrator 12 is made of a flectional metallic material formed substantially into a U shape in plan view to have the driving part 11 which is forked into a pair of opposing pole parts 13 and 13a respectively extended in parallel to each other and shaped substantially square in section. Bonded to the opposing pole parts 13 and 13a at their adjacent two faces, i.e., in the illustrated embodiment, longitudinal outer side and top side faces are piezoelectric elements 14, 14a and 14b, 14c of an elongated plate shape, which are electrically connected to such a power supply unit 15 as shown in FIG. 7, and this unit 15 applies to each of adjacent two of the piezoelectric elements 14 and 14a or 14b and 14c a high frequency voltage at a phase difference of 90 degrees. These piezoelectric elements 14, 14a and 14b, 14c are so arranged here that their polarization direction will be as shown by symbols + and − in the drawing. Further, a contact member 16 is disposed to be contactable with lower side faces of the both opposing pole parts 13 and 13a of the driving part 11.

The vibrator 12 is made preferably of such permanent elastic material as elinvar, but may be made of ordinary steel, other metallic or ceramic material when a high precision or a large amplitude is not required for the vibrator. The opposing pole parts 13 and 13a of the driving part 11 are not necessarily square in section, but may be of any other sectional shape, for example, an octagonal shape obtained by beveling respective corners of the square section, or a shape substantially square but rounded at the corners. In short, the opposing pole parts 13 and 13a may be of a shape having four faces adjacent two of which are in the relationship of right angles to each other.

Further, the vibrator 12 is formed to have a base part 12a continuous to the forked edge parts 13 and 13a while coupling them together and of the length sufficient for causing no adverse effect on the vibration of the vibrator 12 after the same is fixedly installed onto a mounting base 17 at the base part 12a. The contact member 16 is supported desirably by a guide means (not shown) for reciprocating shift in longitudinal direction shown by an arrow P of the member which is normal with respect to longitudinal direction of the edge parts 13 and 13a, while it is also possible to fix the contact member 16 and support the vibrator 12 shiftably by a suitable guide means (not shown) so that the vibrator can be reciprocated in the direction P along the length of the contact member 16. Optimumly, as shown in FIG. 5, the contact member 16 is disposed to oppose other faces of the opposing pole parts 13 and 13a than the faces on which the piezoelectric elements 14 and 14c are provided, so as to contact with, for example, points X and Y on these faces, but the contact member may be made contactable with the side faces of the edge parts on which the piezoelectric elements 14 to 14c are secured but at parts of the faces exposed out of the piezoelectric elements. Further, while the contact member 16 is shown in the present instance as to be contactable with the opposing pole parts 13 and 13a at their tip end zone, the contact zone may not be limited to such tip end zone of the edge parts but may be any zone thereof so long as the zone is out of the piezoelectric elements 14 to 14c and allows a driving force of the vibrator extracted. It is also possible to bring the contact member 16 into contact with the opposing pole parts 13 and 13a through an insulating materials attached onto the piezoelectric elements. Further, the piezoelectric elements have been disclosed to be provided only on the two adjacent faces of the opposing pole parts 13 and 13a, but they may be provided onto three or all four faces thereof.

The operation of the present embodiment shall be detailed next. When the high frequency voltage is applied from the power supply unit 15 to each of adjacent ones of the piezoelectric elements 14, 14a and 14b, 14c on the two opposing pole parts 13 and 13a of the driving part 11 to excite the piezoelectric elements (FIG. 7), the points X and Y in the tip ends of the opposing pole parts 13 and 13a (FIG. 5), that is, the maximum amplitude points of thereby generated vibrations draw such circular or elliptical locus as shown in FIG. 6. Accordingly, the contact member 16 contacting with the bottom faces of the both opposing pole parts 13 and 13a vibrating in the same direction is caused to be linearly moved in the direction P. When the points X and Y draw an elliptical locus, the flatness of the ellipse can be adjusted by changing the flexural rigidity of the forked edge parts 13 and 13a in their flectional bending direction, the magnitude or phase difference of the voltage applied to the piezoelectric elements 14 to 14c, or the like factor. When the voltage is applied to the two piezoelectric elements 14a and 14c at leading phase of 90 degrees, on the other hand, the points X and Y draw a locus opposite in the vibrating direction to that shown in FIG. 6, then the contact member 16 is caused to move in a direction opposite to the direction P.

With such piezoelectrically driving device as referred to above, the vibrator 12 is U-shaped, two parallel legs of which are forming the opposing pole parts 13 and 13a of the driving part 11, and these opposing pole parts 13 and 13a vibrate resonantly to provide a large amplitude vibration, so that an electrical energy can be converted to a mechanical driving force at a high efficiency. That is, as will be clear from FIG. 3a showing the primary mode of the vibrating operation, the vibrator 12 can resonantly vibrate without being subjected to any adverse affection even by its support at an end of the base part 12a to the base 17, and thus can provide a strong driving force at a high efficiency. Further, since the vibrator 12 is in contact at the two opposing pole parts with the contact member 16, multiple contact points can be attained between the vibrator 12 and the contact member 16, the wear-out frictionally caused between the vibrator and the contact member can be reduced, and the driving force can be stably transmitted from the vibrator to the contact member 16.

Further, in the present embodiment, the vibrator 12 can be operated in a higher mode by slightly modifying the piezoelectric elements 14 to 14c. That is, while the primary mode vibration is obtained by providing the piezoelectric elements respectively in the form of a single plate in the foregoing arrangement, but such a secondary mode vibration as shown in FIG. 3b can be realized by dividing each of the piezoelectric elements 14 to 14c longitudinally into two parts and providing these divided two of the respective elements with their polarization directions opposed to each other. Further, such a tertiary mode vibration as shown in FIG. 3c can be realized by dividing each of the piezoelectric elements 14 to 14c longitudinally into three parts, disposing these divided three parts so that the polarization direction of a centrally disposed one of them will be opposite to those of other sideward disposed two, providing a common electrode to the divided parts on their same side face, and applying a high frequency of the same phase to the electrode. With this higher operational mode, the contact points of the vibrator with the contact member can be increased in number and the wearout can be further reduced.

Referring to FIGS. 8 and 9, there is shown another embodiment in which the piezoelectrically driving device according to the present invention is applied to a rotary motor, and substantially the same constituent elements as those in the embodiment of FIGS. 1 to 7 are denoted by the same reference numerals but added by 20. In the present embodiment, a contact member 36 is provided in the form of a disc, and a vibrator 32 having the same arrangement as the vibrator 12 in the embodiment of FIGS. 1 to 7 is supported at an end of base part 32a in a vertical plate part of a mounting base 37 L-shaped in section. In this case, the contact disc member 36 is axially secured to an output shaft 39 rotatably supported by a bearing 38 so that the disc member 36 will be parallel to the vibrator 32 as disposed on a horizontal plate part of the mounting base 37, and the contact member 36 is brought into contact at peripheral part with the vibrator 32 through frictional members 40 attached onto bottom faces at tip ends of opposing pole parts 33 and 33a carrying piezoelectric elements 34–34c of the vibrator 32. The frictional member 40 may be provided alternatively on the side of the contactor or on both of the vibrator and contactor. The erected output shaft 39 is disposed to pass through a space between the opposing pole parts 33 and 33a. As a result, when the driving part 31 of the vibrator 32 is made to vibrate, the contact member 36 is thereby caused to rotate about the output shaft 39. Other arrangement and operation of the present embodiment are substantially the same as those in the embodiment of FIGS. 1 to 7.

Shown in FIGS. 10 to 12 is still another embodiment in which substantially the same constituent elements as those in the embodiment of FIGS. 1 to 7 are denoted by the same reference numerals but added by 40 and the ones arranged symmetrical to the thus denoted elements are by numerals dashed. In the present embodiment, two vibrators 52 and 52' substantially of the same arrangement as that of the vibrator 12 in the embodiment of FIGS. 1 to 7 are provided to be in parallel with each other as spaced, with a plate-shaped contact member 56 interposed between them to contact with opposing faces at tip end parts of four opposing pole parts 53, 53a and 53', 53a'. The vibrators 52 and 52' may be integrally coupled as stacked on each other through a spacer interposed between base end parts 52a and 52a' to be mounted to a mounting base (not shown).

In this case, the maximum amplitude points of the four opposing pole parts 53, 53a, 53' and 53a' draw such elliptic loci as shown in FIG. 12, whereby the contact member 56 is stably driven by a large driving force generated by the two vibrators 52 and 52'. Other arrangement and operation of the present embodiment are substantially the same as those of the embodiment of FIGS. 1 to 7.

The arrangement of FIGS. 10 to 12 may be slightly modified as shown in FIG. 13, in which a vibrator 72 is formed to have two driving parts 71 and 71' respectively including paired opposing pole parts 73, 73a and 73', 73a' which are integrally extended from a common base part 72a.

Referring to FIGS. 14 to 16, there is shown a further embodiment in which substantially the same constituent elements as those in the embodiment of FIGS. 1 to 7 are denoted by the same reference numerals but added by 80 and the ones symmetrical with the thus denoted elements are by numerals dashed. In the present embodiment, a vibrator 92 is substantially H-shaped to have two driving parts 91 and 91' respectively of the same arrangement as that in the embodiment of FIGS. 1 to 7, and they are arranged to be symmetrical with respect to a common central base part. The vibrator 92 is effectively applied to a rotary motor, in which case the vibrator 92 is disposed in a space of a hollow mounting base 97 of a disk shape as centrally secured to the mounting base for free vibration at the driving parts 91 and 91', so as to oppose a disc-shaped contact member 96 which is disposed to be in contact at peripheral part with the vibrator 92 through frictional pieces 98 and 98a attached to suitable portions at tip end parts of paired opposing pole parts 93, 93a and 93', 93a' of the driving parts 91 and 91' of the vibrator 92, while the contact member 96 is axially secured to an output shaft 99 rotatably supported by a bearing 100 as erected in the axial part of the mounting base 97, so that the disk-shaped contact member 96 can be stably driven to be rotated by a large driving force generated by the two driving parts 91 and 91' and the mechanical energy can be extracted from the output shaft 99 at a high efficiency. Other arrangement and operation of the present embodiment are substantially the same as those in the embodiment of FIGS. 1 to 7.

Shown in FIGS. 17 to 19 is a still further embodiment in which substantially the same constituent elements as those in the embodiment of FIGS. 1 to 7 are denoted by the same reference numerals but added by 100. In the present embodiment, unlike the U-shaped vibrator 12 supported in the form of a cantilever in the embodiment of FIGS. 1 to 7, a vibrator 112 is provided in the form of a rectangular frame shape, which is formed to have at its central part a driving part 111 comprising two opposing pole parts 113 and 113a and is fixed at both longitudinal end parts to opposing walls of a mounting base 117. A plate-shaped contact member 116 is brought into contact with bottom faces of the central opposing pole parts 113 and 113a for being driven to be linearly moved in response to the vibration at the edge parts 113 and 113a carrying paired piezoelectric elements 114, 114a and 114b, 114c. When these piezoelectric elements are provided respectively in the form of a single plate, then the vibrator is operated in such a primary mode operation as shown in FIG. 19a. When each of the piezoelectric elements is formed to be two or three divided members as has been explained in connection with FIGS. 3b or 3c, such secondary or tertiary modes operation as shown in FIGS. 19b and 19c can be realized. Other arrangement and operation of the present embodiment are substantially the same as those in the embodiment of FIGS. 1 to 7.

In yet another embodiment shown in FIGS. 20 and 21, two vibrators 132 and 132' respectively similar to the vibrator in the embodiment of FIGS. 17 to 19 are integrally joined through a pair of spacers 137 and 137a held between both end base parts of the vibrators, so as to provide a central space through which a plate-shaped contact member 136 is passed. According to this arrangement, the contact member 136 can be stably driven by a driving force generated by driving parts 131 and 131', which force is larger than the driving force in the case of FIGS. 17 to 19. The vibrators 132 and 132' may be formed in an integral body including integral portions corresponding to the spacers 137, 137a which are thereby eliminated. In the present embodiment, substantially the same constituent elements as those in the embodiment of FIGS. 1 to 7 are denoted by the same reference numerals but added by 120. Other arrangement and operation of the foregoing arrangement are substantially the same as those in the embodiment of FIGS. 1 to 7.

Figure 23:
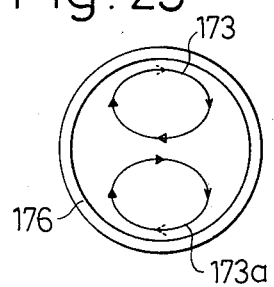
Figure 24:
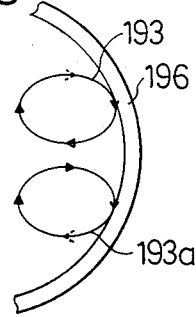

When, for example, a rod-shaped contact member 156 is arranged, as shown in FIG. 22, between opposing pole parts of the vibrator similar to that in the embodiment of FIGS. 1 to 7 or FIGS. 17 to 19 to be peripherally in contact with opposing faces which are vibrating in opposite directions in vibration loci 153 and 153a of the edge parts, the contact member 156 can be driven to be axially rotated. Similarly, as shown in FIGS. 23 and 24, a ring-shaped contact member 176 or 196 disposed to enclose the opposing pole parts showing vibration loci 173 and 173a or 193 and 193a and to be contactable at inner periphery with side faces of the edge parts vibrating in opposite directions (FIG. 23) or in the same direction (FIG. 24) can be driven to be circumferentially rotated.

Figure 25:
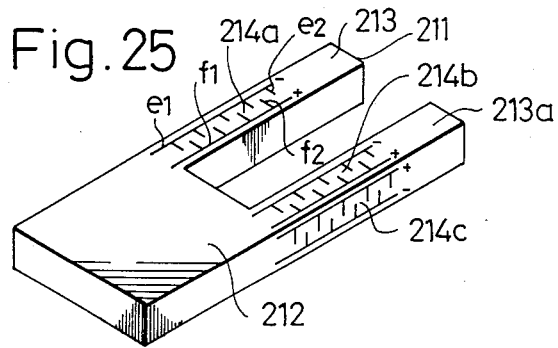
FIGS. 25 to 27 are perspective views of different vibrators in other different embodiments of the present invention.
Figure 26:
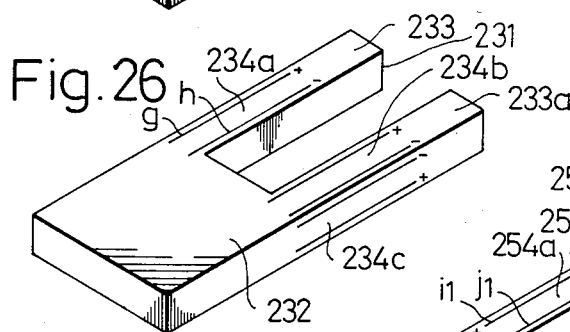
Figure 27:
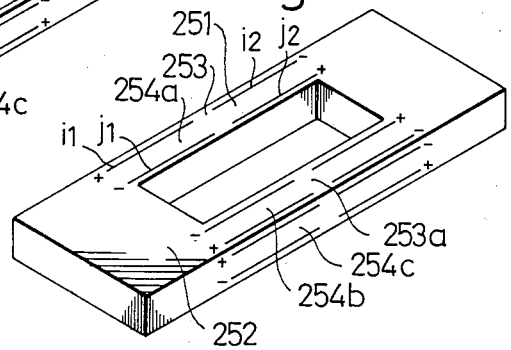

While in the foregoing embodiments the piezoelectric elements have been referred to as being prepared separately and secured to the vibrator, the piezoelectric elements may be integrally mold-formed, as shown in FIGS. 25 to 27, directly in driving part of a vibrator which is shown here to be substantially of the same type as the vibrator of the embodiment of FIGS. 1 to 7 or of FIGS. 17 to 19. In the present instance, the driving part may be made of such piezoelectric ceramic material as lead zirconate titanate (PZT) or a composite material of piezoelectric ceramic and plastic.

More specifically, in an embodiment of FIG. 25, piezoelectric element parts 214 and 214a (only one of which is illustrated) as well as 214b and 214c are directly formed as molded in adjacent two faces of each of opposing pole parts 213 and 213a in a driving part 211 of a U-shaped vibrator 212. In this case, each of the piezoelectric element parts 214, 214a, 214b and 214c comprises two parallel elongated electrodes f1 and f2 extended along both side edge corners in longitudinal direction of the vibrator 212 and two groups of short electrodes e1 and e2 each of which groups extending perpendicularly from one of the electrodes f1 and f2 toward the other in interdigitating relationship. When a DC voltage is applied across the electrodes f1 and f2, such polarization directions as shown, for example, by symbols + and − in the drawing can be set. An application of a high frequency voltage to these electrodes f1 and f2 thus polarization processed causes the opposing pole parts 213 and 213a to be expanded and contracted mainly due to a longitudinal piezoelectric effect of the piezoelectric element parts 214 through 214c, and a flectional vibration is caused to take place in the opposing pole parts. When, therefore, the high frequency voltage is applied to the both electrodes f1 and f2 in the respective piezoelectric element parts with the phase difference of 90 degrees, the opposing pole parts 213 and 213a can be vibrated in such elliptic locus as in the embodiment of FIGS. 1 to 7. Other arrangement and operation of the present embodiment are substantially the same as those in the embodiment of FIGS. 1 to 7.

In an embodiment of FIG. 26, a plurality of parallel electrodes g, h, ... elongated in the longitudinal direction of a U-shaped vibrator 232 and to be in interdigitating relationship are also directly mold-formed in adjacent two faces of each of opposing pole parts 233 and 233a in a driving part 231 of the vibrator 232 to form piezoelectric element parts 234 and 234a (only one of which is illustrated) as well as 234b and 234c. These electrodes g, h, ... of the piezoelectric element parts are subjected to the polarization process, so that flectional vibration can take place at the opposing pole parts 233 and 233a with their expansion and contraction due mainly to latitudinal piezoelectric effect upon the high frequency voltage application to the electrodes. Other arrangement and operation of the present embodiment are substantially the same as those of the embodiments of FIGS. 25 and 1 to 7.

In an embodiment of FIG. 27, a plurality of parallel electrodes extended in the longitudinal direction are mold-formed directly in adjacent two faces of each of opposing pole parts in a driving part 251 of a rectangular frame-shaped vibrator 252 to form piezoelectric element parts 254 and 254a (only one of which is illustrated) as well as 254b and 254c. In this case, the electrodes of the each piezoelectric element part are divided respectively into, for example, two groups of sub-electrodes i1, j1, ... , i2, j2, respectively to be in the interdigitating relationship, and such a secondary mode operation as has been explained in connection with FIGS. 3b and 19b can be realized. Such divided-electrode arrangement can also be employed in the embodiments of FIGS. 25 and 26 and such higher mode operation as explained in connection with FIGS. 3b, 3c and FIGS. 19b and 19c can be realized. Other arrangement and operation of the embodiment of FIG. 27 are substantially the same as those of the embodiments of FIGS. 25 and 1 to 7.

While the piezoelectric element parts are referred to as formed in the adjacent two faces of the opposing pole parts in the respective embodiments of FIGS. 25 to 27, they may be formed in three or all four faces of the opposing pole parts. It should be appreciated that, in the arrangement of directly molding the piezoelectric elements in the opposing pole parts, there arises no instability in the electric characteristics apt to occur due to required bonding-agent layer for securing the separately prepared piezoelectric element to the vibrator, and any piezoelectric element of complex shape or layout can be easily provided in the vibrator.

What is claimed as our invention is:

1. A piezoelectrically driving device comprising a vibrator including a base part and a driving part of a flexible material and contacting with a contact member for causing therebetween a relative movement, and a power supply unit for providing a high frequency voltage to said vibrator, wherein said driving part comprises at least one pair of pole parts, each pole part being substantially square shaped in section, joined at one end to the base part of the vibrator and contacting said contact member at one side face, the pair of pole parts being disposed mutually in parallel, and piezoelectric elements disposed on at least two adjacent faces of each of said pair of pole parts, the piezoelectric elements causing said pole parts to resonantly vibrate upon application of said high frequency voltage from said power supply unit to said piezoelectric elements, said high frequency voltage being applied to the piezoelectric elements sequentially with a predetermined phase difference, the pole parts vibrating with a mutual phase difference corresponding to the predetermined phase difference, whereby the pole parts alternately contact the contact member.

2. A device according to claim 1, wherein said piezoelectric elements are bonded onto said adjacent faces of said pole parts.

3. A device according to claim 1, wherein said vibrator is made of a piezoelectric ceramic material and said piezoelectric elements are formed directly in said pole parts.

4. A device according to claim 1, which comprises two of said vibrators.

5. A device according to claim 4, wherein said two vibrators are disposed as stacked on each other for interposing said contact member between them, said contact member being contactable with said pole parts of said two vibrators.

6. A device according to claim 4, wherein said two vibrators are U-shaped and longitudinally joined to each other to form a substantially H-shaped integral vibrator having two pairs of said pole parts, said contact member contacting with said two pairs of pole parts.

7. A device according to claim 1, wherein said contact member is of a flat plate shape, and said relative movement between said vibrator and said contact member is linear in a longitudinal direction of said plate shaped contact member.

8. A device according to claim 1, wherein said contact member is of a disc shape, and said relative movement between said vibrator and said contact member is a rotary motion.

9. A device according to claim 1, wherein said contact member is of a rod shape and positioned between said pole parts, and said relative movement between said vibrator and said contact member is a rotary motion.

10. A device according to claim 1, wherein said contact member is of a ring shape, and said relative movement between said vibrator and said contact member is a rotary motion.

* * * * *